United States Patent
Souza et al.

(10) Patent No.: US 8,527,845 B2
(45) Date of Patent: Sep. 3, 2013

(54) SYSTEM AND METHOD FOR INGESTING MEDIA CONTENT IN A PEER-TO-PEER NETWORK

(75) Inventors: Victor Souza, Stockholm (SE); Tereza Cristina Melo de Brito Carvalho, São Paulo (BR); Ayodele Damola, Solna (SE); Diego Sanchez Gallo, São Paulo (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 246 days.

(21) Appl. No.: 12/997,586

(22) PCT Filed: Jun. 20, 2008

(86) PCT No.: PCT/EP2008/057885
§ 371 (c)(1),
(2), (4) Date: Apr. 5, 2011

(87) PCT Pub. No.: WO2009/152865
PCT Pub. Date: Dec. 23, 2009

(65) Prior Publication Data
US 2011/0179328 A1    Jul. 21, 2011

(51) Int. Cl.
*H03M 13/00* (2006.01)

(52) U.S. Cl.
USPC .......................................................... 714/776

(58) Field of Classification Search
USPC .......... 714/776; 709/201, 226, 231; 370/241
See application file for complete search history.

(56) References Cited

U.S. PATENT DOCUMENTS

| | | | |
|---|---|---|---|
| 2006/0080454 A1* | 4/2006 | Li | 709/231 |
| 2008/0069002 A1* | 3/2008 | Savoor et al. | 370/241 |
| 2010/0011103 A1* | 1/2010 | Luzzatti et al. | 709/226 |

FOREIGN PATENT DOCUMENTS

| | | |
|---|---|---|
| EP | 1 633 111 A1 | 3/2006 |
| WO | 03/069495 A1 | 8/2003 |

OTHER PUBLICATIONS

PCT International Search Report, mailed Apr. 8, 2010, in connection with International Application No. PCT/EP2008/057885.

(Continued)

*Primary Examiner* — Sam Rizk
(74) *Attorney, Agent, or Firm* — Potomac Patent Group PLLC

(57) ABSTRACT

The invention relates to a method and system hardware for ingesting media content in a peer-to-peer network from a data stream. The data stream is made up of a sequence of packets of media data, and each packet is identified by a sequence identifier. The method includes commencing caching of the data packets from the data stream. A missing data packet is identified using the sequence identifiers of the packets and the size of the missing data packet is determined. A portion of the memory medium is skipped to provide a skipped portion of medium having no data cached therein. The skipped portion has a size corresponding to the determined size of the missing data packet. The missing data packet is then retrieved and inserted into the skipped portion of the memory medium. The system includes an ingestion element configured to receive the content in a data stream, to define blocks of media data that make up the content, to generate metadata associated with each block, the metadata identifying the construction of the block from the data stream, and to transmit the data stream as a multicast stream to other network nodes. The other network nodes include at least one cache element configured to construct at least one of the blocks from the multicast data stream in accordance with the metadata, and to cache the data block. The system also includes a database accessible to network nodes, the database recording a location of each of the cached data blocks in the network.

20 Claims, 7 Drawing Sheets

(56) References Cited

OTHER PUBLICATIONS

PCT Written Opinion, mailed Apr. 8, 2010, in connection with International Application No. PCT/EP2008/057885.

International Preliminary Report on Patentability, mailed Oct. 13, 2010, in connection with International Application No. PCT/EP2008/057885.

* cited by examiner

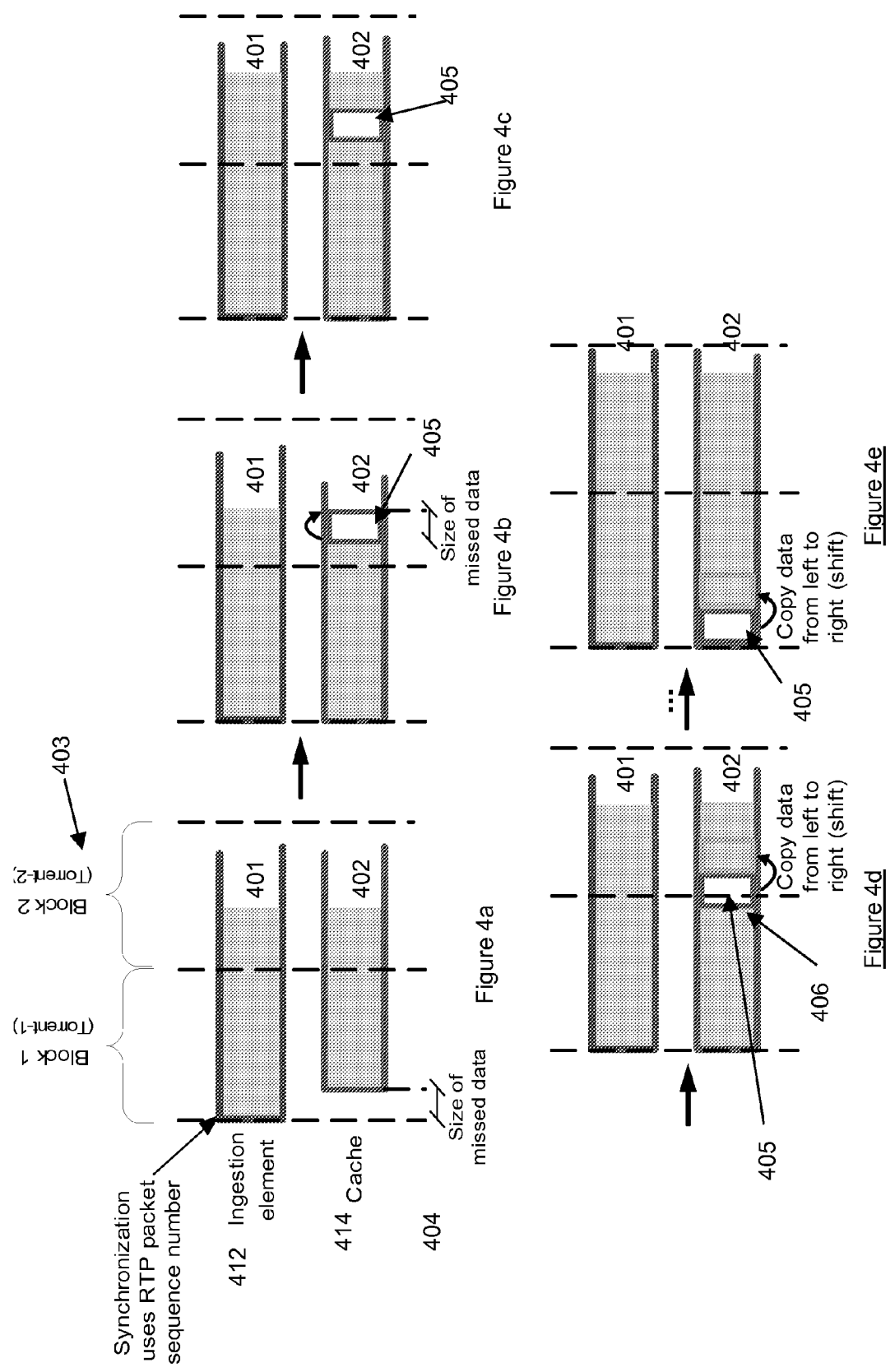

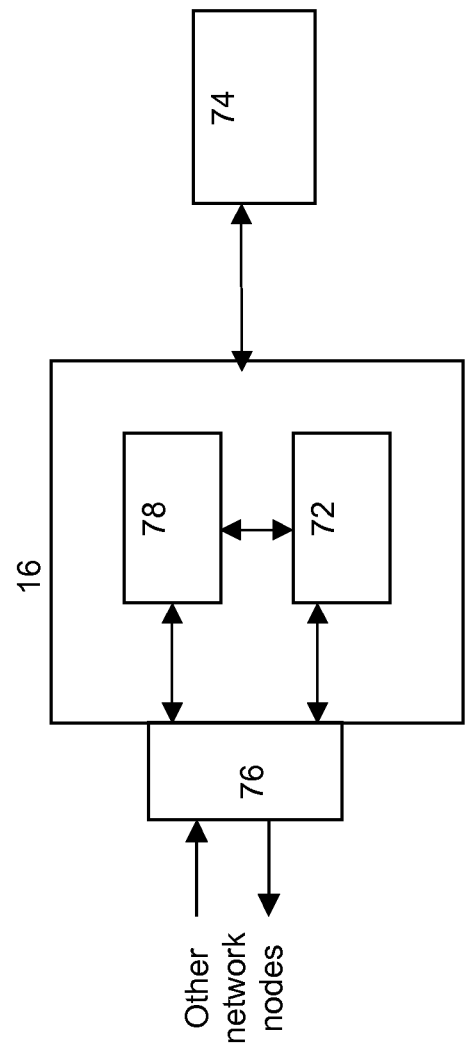

SYSTEM AND METHOD FOR INGESTING MEDIA CONTENT IN A PEER-TO-PEER NETWORK

TECHNICAL FIELD

The present invention relates to a system functional architecture and method for ingesting media content in a peer-to-peer communications network. The invention is particularly, but not exclusively, concerned with the provision of Internet Protocol television.

BACKGROUND

Internet Protocol Television or IPTV is a term used to refer to the delivery of television and video (collectively referred to below as "TV") over IP-based communication networks. IPTV is in fact a collection of protocols including compression, playout, and distribution protocols. In terms of distribution across networks, three classes have been defined, namely multicast, unicast, and peer-to-peer distribution.

Of these, it is envisaged that multicast will be used mainly for live-streaming of TV. Multicast relies upon the IETF defined Internet Group Management Protocol (IGMP) to create and change multicast receiver groups at multicast agents within an IP network. Multicast agents receive TV and multicast it onwards to group members. Multicast is a very effective mechanism for transporting a set of TV channels to a large number of viewers.

Multicast is not however a suitable distribution mechanism for so-called "time-lapse TV", where a viewer can pause a live-TV program and then resume watching it at a later time, or "timeshift TV" where previously aired TV programmes can be viewed at a later time. IPTV, like satellite TV or cable TV, usually only allows the watching of time-shifted content if the user had configured the system in advance to record that specific content, through the use of personal video recorders (PVRs). It is also possible to have network-based PVRs, allowing users to receive time-shifted content from the network via unicast, but in this case, there are significant cost implications due to the infrastructure required to handle all these unicast streams. Unicast distribution typically relies upon the Real Time Streaming Protocol (RTSP) which allows a client to remotely control a streaming media server. Unicast creates individual sessions for each connected user, so the same content will get transferred once per user over the network and therefore can be used as a method for delivery of Video-on-Demand, time-lapse TV and similar (more personal) TV services. However, a disadvantage of unicast distribution is that it consumes a large amount of bandwidth in the network and resources in the media server making this type of delivery not cost effective.

Peer-to-peer distribution (also know as "P2P") uses each client and/or node in a network for the distribution of media. When a program is viewed by a given client/node, different parts of the program can be downloaded from different neighbouring clients/nodes. Network operators might want to implement restricted P2P distribution within their own networks, with content being cached at multiple nodes within a given network for onward transfer to clients. Clients may or may not be able to share content between each other. P2P has a lot of advantages and lies somewhere in between unicast and multicast when it comes to bandwidth usage.

However, problems arise in the implementation of a P2P IPTV system because the media content must be ingested. The original streamed multicast TV signals must be cached, usually at multiple network nodes, and then shared in an ordered manner among the caching nodes. The present invention relates to a method, and system architecture for implementing the method, of ingesting multicasted media content into a peer-to-peer network.

SUMMARY

According to a first aspect of the present invention there is provided a method of ingesting media content in a peer-to-peer network from a data stream. The data stream is made up of a sequence of packets of media data, and each packet is identified by a sequence identifier. The method includes commencing caching of the data packets from the data stream into a memory medium. A missing data packet is identified using the sequence identifiers of the packets and the size of the missing data packet is determined. A portion of the memory medium is skipped to provide a skipped portion of medium having no data cached therein. The skipped portion has a size corresponding to the determined size of the missing data packet. The missing data packet is then retrieved and inserted into the skipped portion of the memory medium.

It is an advantage that, by identifying a missing data packet and determining its size, a corresponding size of memory is skipped so that when the data packet is retrieved it can simply be inserted in the right place. This avoids the need to buffer and copy large amounts of data.

In embodiments of the invention, the data stream is a multicast data stream, and may comprise video data.

The method may further include defining a block of media content to be ingested, and generating metadata associated with the block, the metadata identifying the media content of the block. Preferably, the metadata is published so that it is accessible to users of the peer-to-peer network. The metadata also preferably includes at least the sequence identifier of the first data packet in the associated block. The sequence identifier may then be used by other peers of the peer-to-peer network to define a video block from the multicast data stream and to announce possession of the video block to the peer-to-peer network. The video block may be comprised of segments and the metadata associated with the video block may include the hashes of the segments.

The method may further include sending instructions to a network cache node, which include instructions to commence ingesting of data packets from the data stream into a file in the memory medium. Where the missing data packet is a data packet located before the first of the data packets ingested into the memory medium, and when the skipping of a portion of the memory medium occurs after the caching of the first data packet, the method may further comprise shifting the skipped portion of the memory medium with no data cached therein to the beginning of the file before the missing data packet is retrieved and inserted.

According to a second aspect of the present invention there is provided a method of ingesting media content from a data stream that comprises a sequence of packets of media data. The method includes commencing caching of data packets from the data stream into a memory medium. A determination is made of the size of missing data packets before a first of the data packets cached into the memory medium. A portion of the memory medium is skipped to provide a skipped, empty portion of medium having no data cached therein, the skipped portion having a size corresponding to the determined size of missing data packets. The skipped empty portion is shifted to before the first cached data packet.

It is an advantage that, by identifying the size of the missing data packets missed before the start of the caching, a corresponding size of memory is skipped and then shifted to the beginning of the cached data. This can be done while data continues to be cached from the data stream. The missing data packets can then be retrieved it can simply inserted in the right place at the beginning of the file. This avoids the need to buffer and copy large amounts of data.

In embodiments of the invention, each of the data packets includes a sequence identifier, the size of the missing data packets being determined from the sequence identifier of the first of the data packets cached into the memory medium. The size of the missing data packets may be determined based on the sequence identifier of an initial packet in the sequence of packets.

In embodiments of the invention, the shifting may comprise progressively rewriting cached data packets from before the skipped empty portion into the memory medium so that these occur after the skipped empty portion, thereby shifting the skipped empty portion to before the first cached data packet.

Preferably, the method further includes retrieving the missing data packets and inserting these into the skipped empty portion before the first cached data packet. The missing data packets may be retrieved from one or more network nodes.

According to a third aspect of the present invention there is provided a system for enabling sharing of media content among network nodes in a peer-to-peer communications network. The system includes an ingestion element for receiving a data stream comprising the media content. The ingestion element is configured to define blocks of media data that make up the content, to generate metadata associated with each block, the metadata identifying the construction of the block from the data stream, and to transmit the data stream as a multicast stream to a plurality of network nodes. The plurality of network nodes includes at least one cache element configured to construct at least one of the blocks from the multicast data stream in accordance with the metadata, and to cache the data block. The system also includes a database accessible to network nodes, the database recording a location of each of the cached data blocks in the network.

The database may be distributed over the network and may comprise a distributed hash table.

According to a fourth aspect of the present invention there is provided a network node in a peer-to-peer communications network. The network node is configured as an ingestion element for receiving and controlling caching of media content from a data stream. The network node includes a processor configured to define blocks of media content to be cached from the data stream, and to generate metadata associated with each block, the metadata identifying the media content of the block. The network node also includes a communications interface for receiving the data stream, for transmitting a corresponding multicast data stream to other nodes of the network, for publishing the metadata so that it is accessible to users of the peer-to-peer network and for sending instructions to one or more cache nodes of the network to commence caching of the blocks.

According to a fifth aspect of the present invention there is provided a network node in a peer-to-peer communications network The network node is configured as a cache element for caching of media content from a data stream that comprises a sequence of packets of media data. The network node includes a memory medium for caching the content by sequentially copying of the data packets from the data stream. A processor is configured to identify a missing data packet and determine a size of the missing data packet, and skip a portion of the memory medium to provide a skipped portion of medium having no data cached therein. The skipped portion has a size corresponding to the determined size of the missing data packet. The processor also inserts a retrieved data packet into the skipped portion of the memory medium. A communications interface is used for retrieving the missing data packet from another network node.

In embodiments of the invention the missing data packet is a data packet from before a first of the data packets cached into the memory medium. The processor is configured to determine a size of missing data packets before a first of the data packets cached into the memory medium and to skip a portion of the memory medium. The skipped portion is an empty portion having a size corresponding to the determined size of missed data packets from before a first of the data packets cached into the memory medium. The processor is also configured to shift the skipped empty portion to before the first cached data packet prior to retrieving and inserting the missing data packet.

According to a sixth aspect of the present invention there is provided user equipment configured as a client node in a peer-to-peer communications network that provides a service enabling a user to receive time-shifted media content. The user equipment includes a memory for storing media data, a user interface for enabling the user to select and control downloading and exhibition of media content, a communications interface for receiving data from other nodes of the network, and a processor. The processor is configured to retrieve metadata associated with blocks of media content that have been cached in the network from a metadata repository in the network, and an indication of a location in the network where each of said blocks is cached. The processor is also configured to retrieve the blocks from the indicated locations, and to exhibit the blocks in a sequence defined by the metadata.

In embodiments of the invention, the user equipment is configured to enable the user to receive live and time-shifted content available. The user equipment may be configured to download content from a plurality of indicated locations simultaneously. The locations may comprise one or more of an ingestion element, a cache element and other client elements.

Preferably, the processor is configured to insert the client node into a network database as a source of that content to share with other clients. The network database may comprise one or more distributed hash tables.

The user equipment may be comprised in a set-top box.

BRIEF DESCRIPTION OF THE DRAWINGS

FIGS. 4a to 4e illustrate in more detail stages in part of the process of caching media data of FIG. 3.

FIG. 7 is a schematic representation of user equipment forming a client element network node of the system of FIG. 1.

DETAILED DESCRIPTION

The current invention allows the exhibition of media content any time later than the start of the "live" transmission of that content in a channel, without requiring the storage capability in the end-user equipment (set-top box, STB) to store all the content. Also the described method provides a way to store content that was multicasted in the network thereby freeing the user from the need to configure in advance the recording of a specific TV program. Even though the method and system architecture described here relates to an IPTV service scenario, the same principles can be used to distribute any type of media, e.g. web radio.

In the description of the exemplary system and method that follows, a stream with video content is captured and stored as a set of blocks (i.e. segments or chunks) in a group of distributed nodes, from which end user terminals are able to download the content. The process entails the logical division of the stream into blocks, saving information about the construction of the chunks in metadata files, and then making this metadata available to other nodes. In other words, this process is used to create an ingestion of multicasted content into a P2P network. By following this process, nodes in the network are capable of sharing pieces of content in an organized way.

Figure 1:
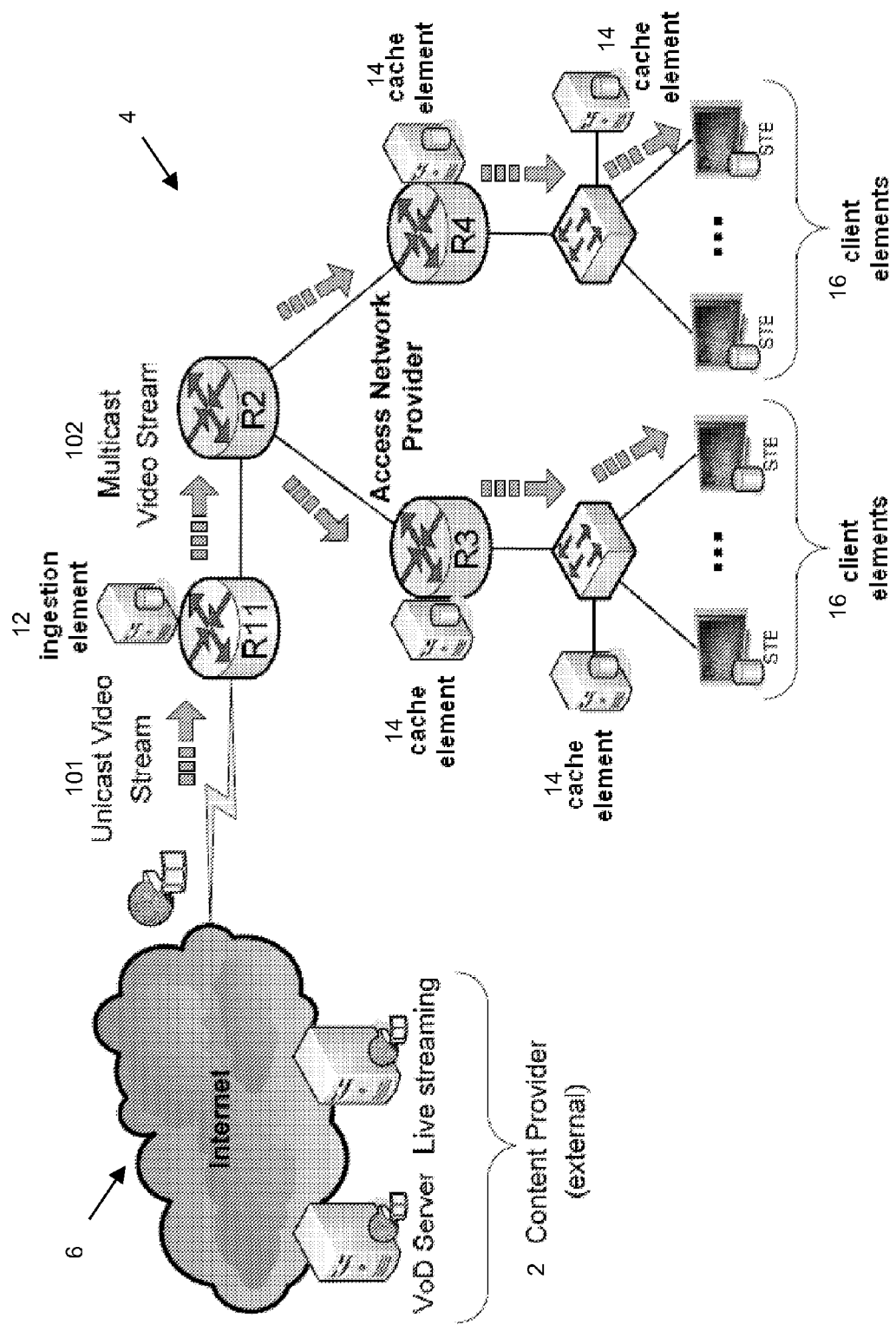
FIG. 1 is a schematic illustration of the systems architecture of a peer-to-peer network.
Figure 2:
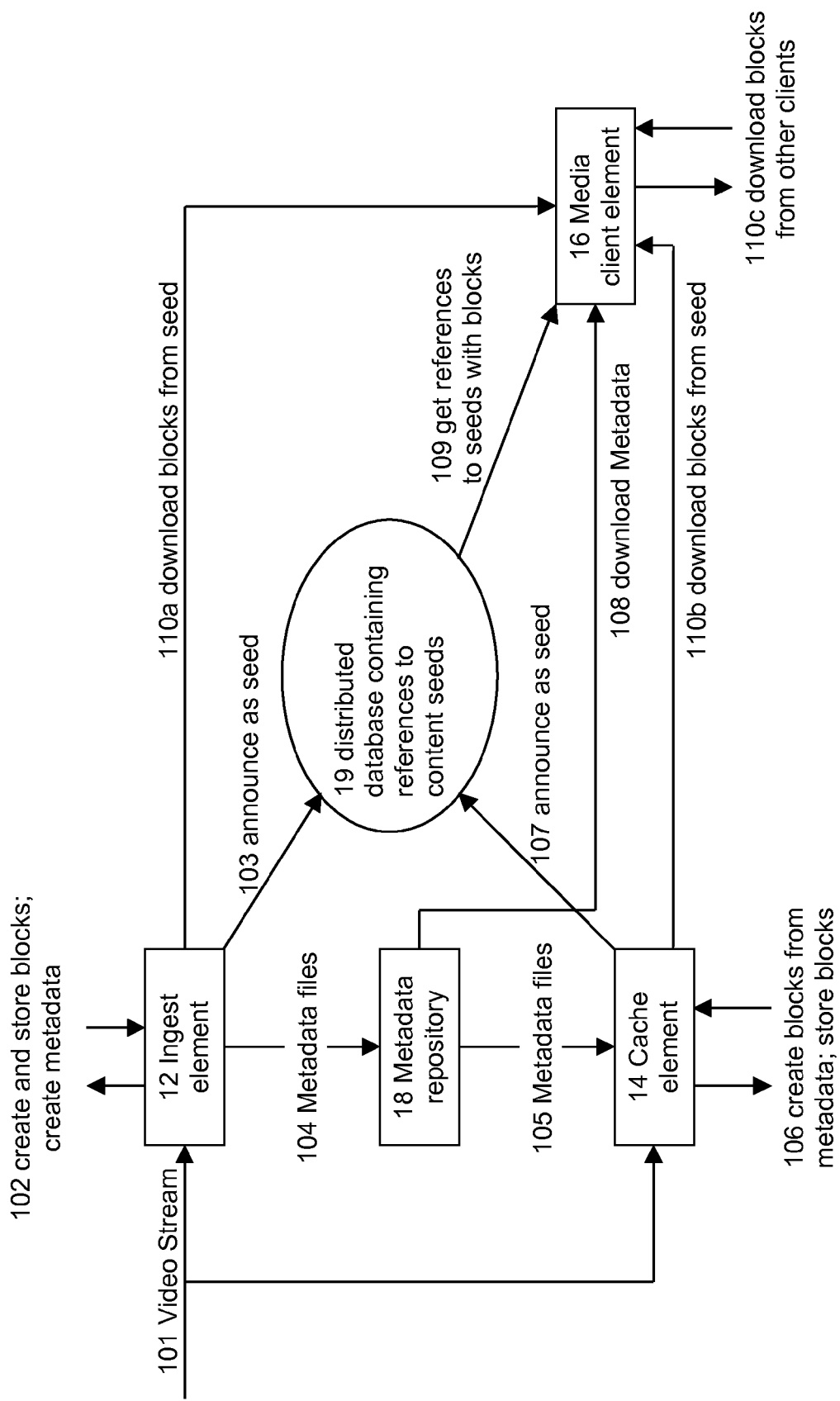
FIG. 2 is a diagram illustrating the processes involved in a method of caching media content in the system of FIG. 1.

FIG. 1 illustrates an exemplary overall system architecture and FIG. 2 illustrates the process stages by which a linear video media stream 101 is handled to enable the subsequent provision of the media content over a peer-to-peer network 4. The system architecture comprises three main elements: an ingestion element 12; a cache element 14; and a client element 16 (such as a set-top box, STB) that provides the user with the ability to receive live as well as time shifted content.

The delivery of linear TV utilizing a multicast channel is the way most IPTV providers deliver their service today. As shown in FIG. 1 a content provider 2 is external to the P2P network 4, and provides both live TV and video on demand services by means of a unicast stream over the internet 6 to an access network. The ingestion element 12 receives the video stream and is responsible for transmitting the media content to other nodes of a P2P network 4 as a multicast stream 102. In order to allow the content to be viewed in a timeshift manner, at least one (and frequently more than one) of the nodes is used to cache the content according to the procedures described below. The cache elements 14 are spread throughout the network and may reside at different levels in the network.

When an end-user would like to start watching content in a timeshift manner, the client element 16 will query the P2P network 4 to obtain a list of sources (or "seeds") of that content. The client element 16 will then establish multiple simultaneous connections with those sources to obtain all the pieces of that content. In many circumstances the STBs residing in the end-users' premises also possess a hard disk and are capable of storing content on behalf of the operator or on behalf of the end-user. Therefore, when a client is watching content in a timeshift manner the source of the content might be either another end-user's STB or a caching server 14 in the network.

Referring to FIG. 2, the ingestion element 12 receives the video stream and is responsible for starting a multicast transmission of the media content to other nodes of the P2P network 4. This multicast stream may be used to view the transmission live, but is also used for caching the content at cache elements 14. At step 102, the ingestion element 12 divides the media content into blocks (using predefined criteria, which are not of importance for the purposes of this invention) and generates metadata associated with the blocks. Note that the multicast transmission of the content could be initiated by another media streaming server, in which case the ingestion element 12 must receive the multicast content in order that it can carry out the processing at step 102. At step 103, the ingestion element 12 then informs ("announces as seed") the P2P network 4 that it possesses the referred video block and so is a source of the content in that block. This information is stored in a database 19, which may be distributed across the P2P network 4. For example, in structured P2P networks this is usually achieved by inserting itself in the Distributed Hash Table (DHT) as a peer for this content.

In order that the P2P network 4 can enable sharing of content that is cached at cache elements 14, or stored in other users' STBs, and that users can download different pieces of content from different nodes of the network, a consistent naming scheme needs to be defined for the blocks. This function is performed by the ingestion element 12 at step 102 when it defines the video blocks. The definition of video blocks is then inserted in a meta-data file (e.g., a torrent file) which is made accessible to all the other clients in the network. Thus, periodically, the ingestion element 12 generates a meta-data file for the video block of a given interval, and, at step 104 publishes this meta-data file in a repository 18.

Figure 5:
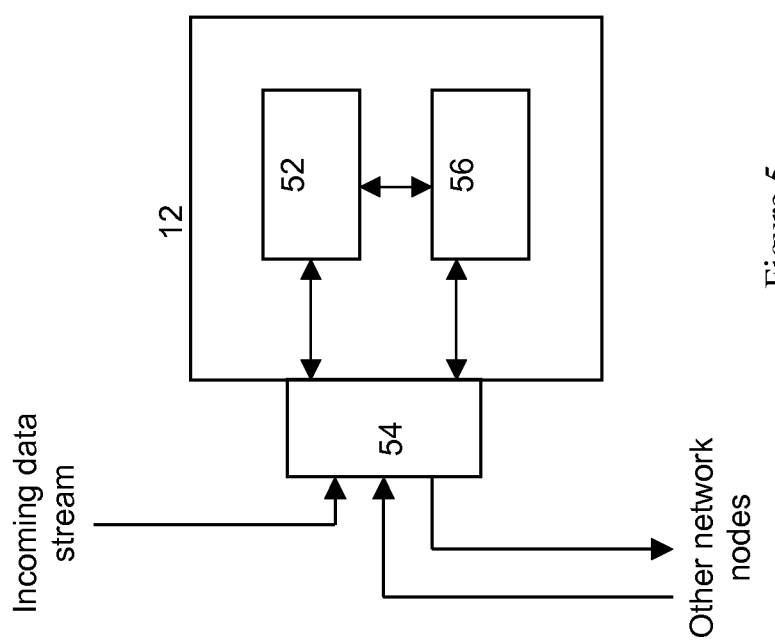
FIG. 5 is a schematic representation of a network node for use as an ingestion element forming part of the system of FIG. 1.

An embodiment of an ingestion element 12 is shown schematically in FIG. 5. It is a network node that communicates with other network nodes and may include a server having a processor 52 configured to define the blocks of media content to be cached from the data stream, and to generate the metadata associated with each block. It includes a communications interface 54 through which it receives the incoming data stream, transmits a corresponding multicast data stream to other nodes of the network, publishes the metadata to a metadata repository 18 (see FIG. 2) so that the metadata is accessible to users of the peer-to-peer network, and sends instructions to one or more cache nodes of the network to commence caching of the blocks. The ingestion element 12 may also include a memory 56 for storing data and program instructions, and into which it may store blocks of media content. The ingestion element 12 controls the caching of the media content according to a process that will be described in more detail below.

In general, service agreements with the end user subscribers, will require the service provider to ensure that content within a defined time window is available for timeshift viewing (e.g., the service provider guarantees that content from the past 3 weeks can be watched at any time). The ingestion element 12 is the network element that will make sure, in the case of this example, that at least one copy of every item of content in the past 3 weeks is maintained in a cache.

Figure 6:
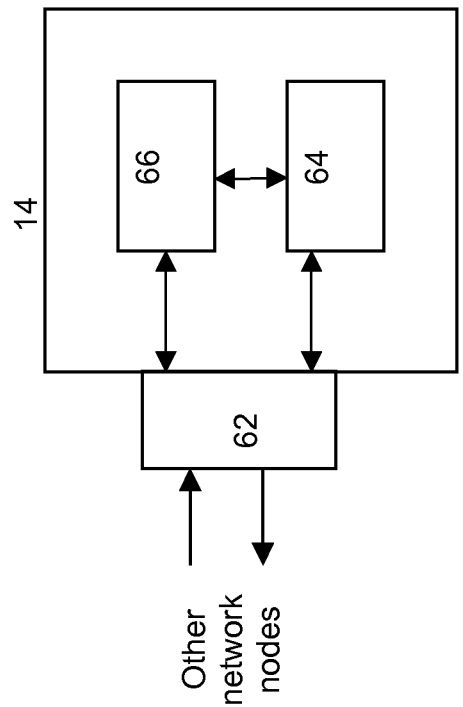
FIG. 6 is a schematic representation of a network node for use as a cache element forming part of the system of FIG. 1.

An embodiment of a cache element 14 is shown schematically in FIG. 6. It is a network node that includes a communications interface 62 for sending and receiving data to/from other network nodes and a memory 64 for caching the content by sequentially copying of the data packets from the data stream. It also includes a processor 66 configured to control the caching process in accordance with the methods described below and caching instructions received from the ingestion element 12.

The cache element 14, which may be a dedicated cache server, is responsible for caching of the content to allow subsequent timeshift viewing. As indicated above, the cache element 14 includes a storage medium for caching the content. For each block of content to be cached, the metadata generated by the ingestion element 12 is downloaded to the cache element 14 at step 105. At step 106, when the multicast stream is transmitted to the P2P network 4 by the ingestion element 12, the cache element 14 creates the relevant blocks, identified by the metadata, from the multicast stream and verifies the integrity of the cached content. At step 107, the cache element informs ("announces as seed") that it possesses the referred block of content, inserting itself in the peer-to-peer network 4 as a source for such content (usually done using a DHT).

Note that, in embodiments of the invention, the network operator may force caching of content in the client element 16. That is to say that the client element 16 may also be used as a cache element 14. For example, part of the storage space in the user's STB may be controlled by the operator. Furthermore, when the user watches linear TV that content can also be cached and made available in the P2P network.

The cache element 14 may also obtain content from another node over the peer-to-peer network 4 (i.e. in the same way that the client element 16 would). This allows the service provider greater flexibility in caching or re-caching content, for example enabling content that has been broadcasted in the past, or is available from different originating content stream providers to be added to the cache elements.

The client element 16 is embodied in user equipment (for example a STB). An embodiment is shown schematically in FIG. 7 and includes a memory 72 for storing media data. A user interface 74, such as a remote control or key-pad, enables the user to select and control downloading and exhibition of the time-shifted media content. A communications interface 76 allows the client element 16 to communicate with and to send and receive data to/from other nodes of the network. The client element 16 also includes a processor 78 that is configured to retrieve metadata from the metadata repository 18 (see FIG. 2), as well as the blocks of media content from the other network nodes where these have been cached. The client element 16 may be an application that runs on the end-users set-top box, the user interface allowing the user to list, select and control viewing of the live and timeshift contents available. For example, this may involve the client element 16 joining the DHT (using a network bootstrap node specified in a properties file). The client element 16 is capable of both receiving a multicast channel (linear TV service) and receiving content over the P2P network 4 (timeshift TV service).

When the user wishes to view available timeshift content (for example by selecting a programme from a displayed menu of available programme choices), at step 108 the client element 16 downloads the relevant metadata from the repository 18. The metadata identifies the blocks that have been cached. At step 109, the client element 16 then queries the network database (DHT) 19 to ascertain at which network nodes the content has been cached and obtains from the DHT a list of peers that are sharing the content (the peers may be cache nodes 14 or other users' STBs). The client element 16 can start downloading the cached content—at step 110a it downloads any content that may have been cached at the ingestion element 12, at step 110b it downloads content cached in any of the cache elements 14, and at step 110c it downloads content from other clients. The steps 110a, 110b and 110c are typically performed in parallel. The client element 16 can then start exhibiting content as soon as there are enough pieces already downloaded to show the content without interruptions. Finally (but not shown in FIG. 2), the client element 16 can insert itself in the DHT as a source of that content to share with other clients.

The multicast data stream is made up of Real Time Protocol (RTP) packets of data, wherein each packet has a unique RTP sequence number. The cache element 14 receives the streamed content (through multicast) and writes the payload of the RTP packets into a file. The Ingestion Element 12 is responsible for defining the video blocks that will be shared over the P2P network 4. This process is illustrated schematically in FIG. 3. At step 301, an ingestion element 312 defines a first block (Block 1) and at step 302 generates the associated meta-data file (torrent file), which is then made accessible to all the other clients in the network. A video block contains a set of video segments, which in turn contain a set of video frames. The video segment is the smallest unit to be shared over the P2P network 4. This process is repeated for each subsequent block of the stream so that, in a periodic manner, the ingestion element 312 generates a meta-data file for each video block. At step 303, the hash of each video segment in each video block is calculated and inserted in the metadata file, and this can then be used by the cache nodes where the block is being cached to check the integrity of the data.

Figure 3:
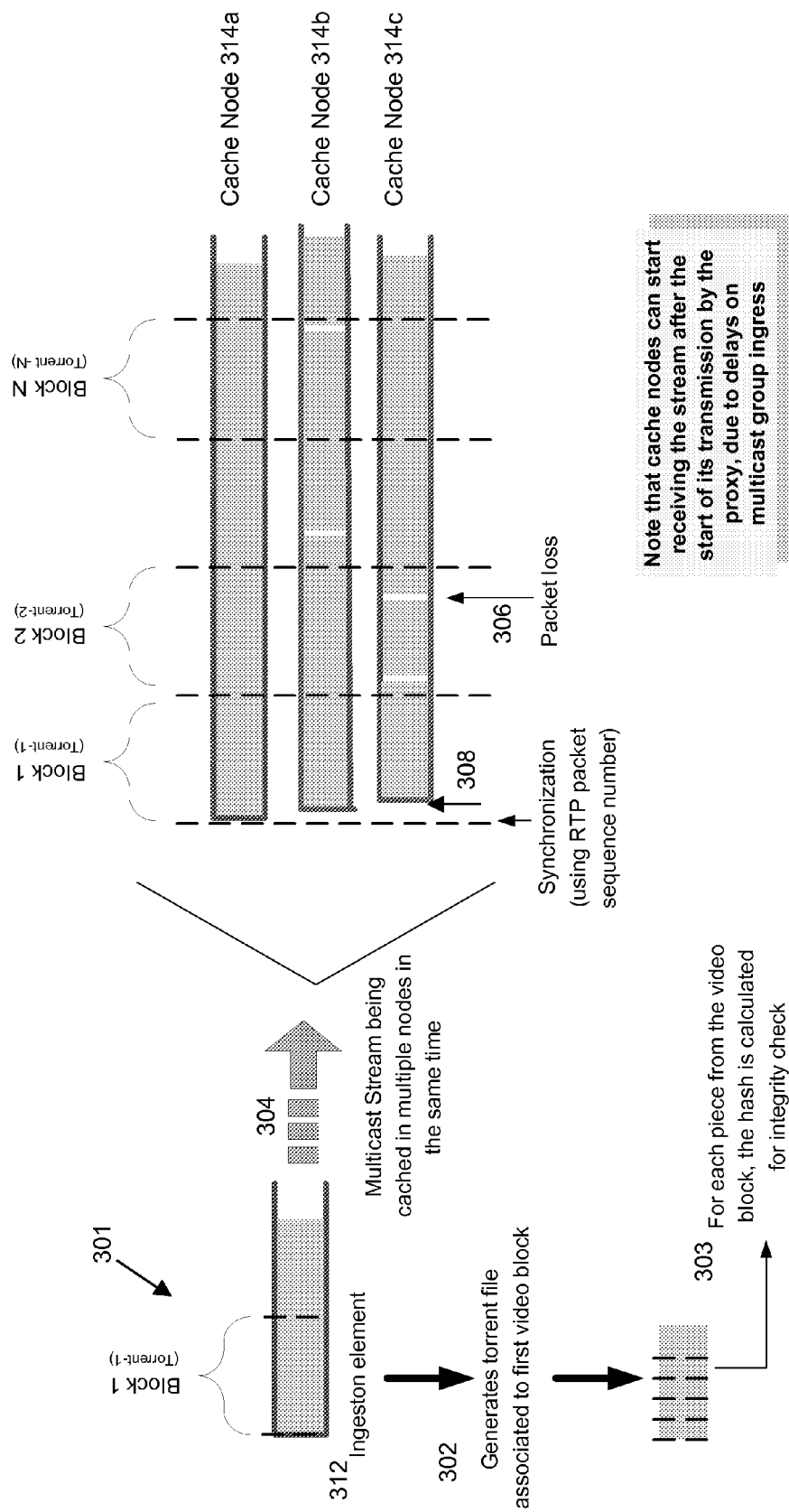
FIG. 3 is a further schematic illustration of a method of caching media data.

At step 304, the ingestion element 312 transmits the data stream onwards as a multicast transmission to the P2P network, including those cache nodes where the content is to be cached. As shown in FIG. 3, three cache nodes 314a, 314b and 314c, are used to cache the content, but it will be appreciated that more, or fewer cache nodes could be used. Preferably, the ingestion element 312 itself caches the data blocks, and creates a master cache file of the data stream.

In order to make this content available to the end users in a collaborative manner (i.e. allowing the end user to download parts of the content from different nodes), the cached files have to be synchronized among all cache nodes. For this purpose, the cache nodes 314a-c keep track of the RTP sequence number of each arriving packet. However, there are always likely to be data packets that are missed by the cache node. These fall into two categories. Firstly, there may be interruptions in the course of the multicast data stream received at any given cache node where a packet is lost, such as the data packet 306 at cache node 314c shown in FIG. 3. For example, network congestion can cause routers to throw away packets in the course of transmission of a data stream. These will be perceived as packet losses by the receivers of the data stream. The cache node 314c can identify a packet loss from the missing RTP sequence number and in that case it leaves a blank space in the file when the packet loss is identified. The recovery of missing data packets can be performed later on from the data that is cached at other cache nodes, or from the master cache file at the ingestion element 312.

The second category of lost data packets occurs at the beginning of the cached data, such as the lost data 308 in FIG. 3, because the first packet that each cache node receives may neither be the same, nor the first streamed packet. This is because delays in the multicast group ingress mean that the cache nodes 314a-c may start receiving the multicast stream after the start of its transmission. One way to allow for this would be to reserve enough memory for buffering the whole video block, retrieving any missing data packets and then writing the completed block to the cache memory. However, this is extremely wasteful of memory resources. Instead, the method of the present invention, after verifying how much data was lost, shifts the cached data as much as necessary to reserve exactly the space required to obtain the missing parts.

The cache nodes 314a-c obtain the metadata generated by the ingestion element 312, which contains the RTP sequence number used in the first streamed packet, and use this information to identify how many packets were lost at the beginning, calculating how much space these lost packets would take up. Based on this, each cache node 314a-c synchronizes its own file, shifting the cached content so that it matches the file defined by the ingestion element 312.

The process is shown schematically in FIGS. 4a to 4e. The top bar 401 in each of FIGS. 4a to 4e represents the multicast data stream transmitted by an ingestion element 412 with the content blocks 403 that it has defined (indicated in FIG. 4a only), while the lower bar 402 represents the sequence of data cached by a cache element 414 (indicated in FIG. 4a only).

The cache element 414 caches blocks of data packets from the multicast data stream 402 by writing them to a sequential file in a memory medium. It starts caching the data packets from the multicast data stream 401 as soon as it is instructed to do so by the ingestion element 412. However, as explained above, the first data packet it caches may not be the first in the data stream 401, but there may be a gap 404 of missing data packets. Initially, the cache element 414 does not know if the data it is caching starts at the beginning of the data stream, or if there are missing data packets that will need to be retrieved later on. Therefore, as shown in FIG. 4a, it starts writing the first block of data (defined in metadata file number 1) into the sequence of data packets 402 in the memory medium, and when this has been done it checks the RTP sequence number of the first data packet that it wrote in the first block against the RTP sequence number of the initial data packet in the data stream 402 (which it obtains from the metadata). It can then calculate the size of the missing data packets 404 that it will need to retrieve later.

However, these missing data packets, when retrieved, will need to be inserted at the beginning of the cached sequence 402 of data packets. Therefore, as shown in FIG. 4b, while it continues caching the data packets from the data stream 401, it skips ahead to leave a blank portion 405 in the sequence of data packets 402 written to the memory medium, as shown in FIG. 4c. This blank portion 405 with no data packets recorded, has the same size as the missing data packets 404. Next, it must move this blank portion 405 so that, instead of being in between cached data packets in the cached sequence 402, it is located at the start of the sequence 402. To shift the data, it is very important to keep in mind that the caching process is still active and there must be no interruption to the writing of data to the end of the file. As shown in FIG. 4d, data is shifted by progressively re-writing the last data packet 406 before the blank portion 405 into the end of the blank portion 405, until all the data packets back to the beginning have been rewritten and the blank portion 405 is at the start, as shown in FIG. 4e. Note that the stream continues to be cached in parallel to this shifting process, but this does nor cause a problem because there is no simultaneous writing to the same part of the cached data file. In this way the cached data file is synchronized, and the initial lost data packets can be recovered from other nodes.

After this process is finished the cache elements can verify the integrity of the cached data by calculating the hashes of each segment of a block and checking if these match with the ones generated by the ingestion element (and provided in the metadata). Any modified or erroneous data can be discarded.

Figure 8:
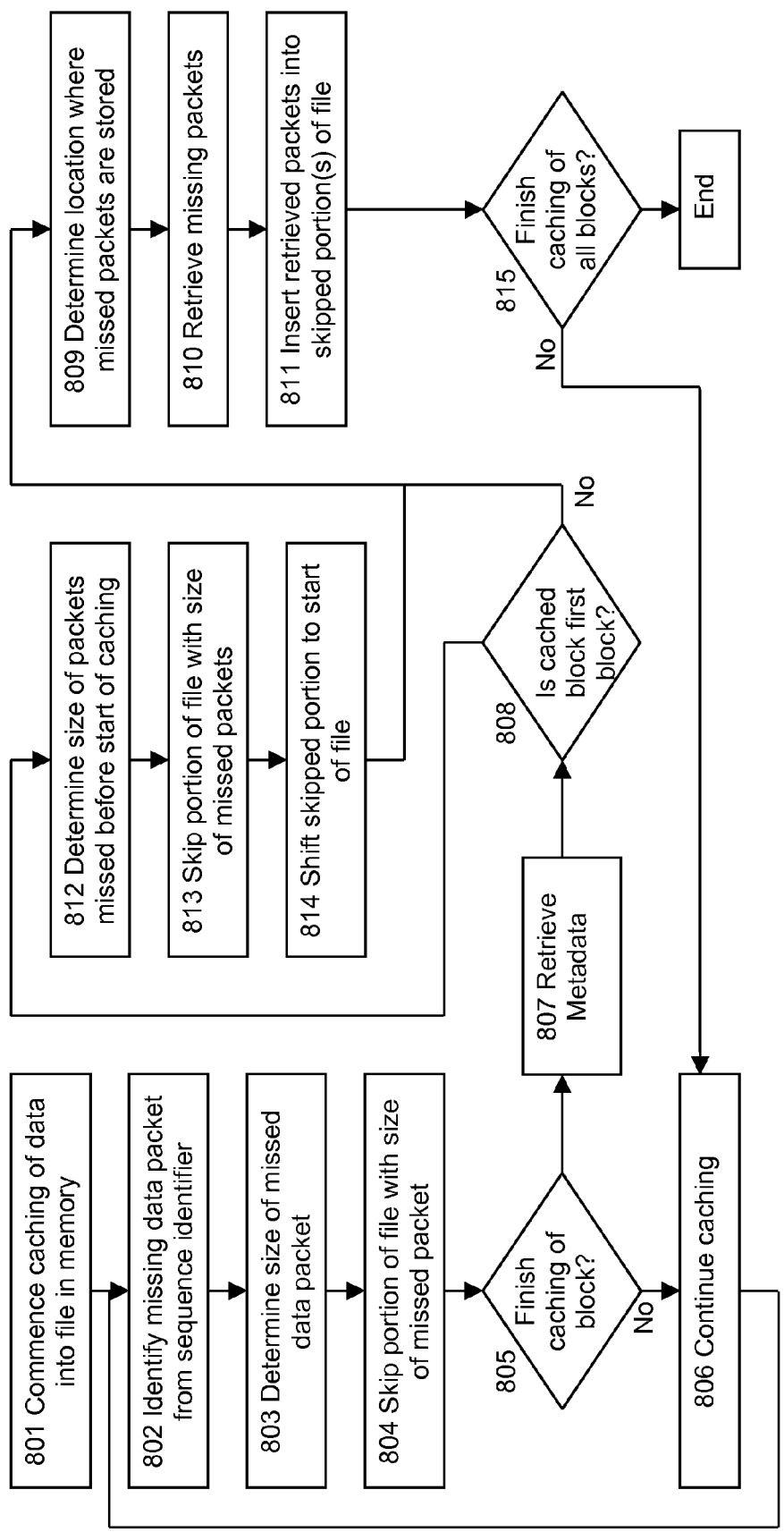
FIG. 8 is a flow-chart illustrating the steps of a method of ingesting data.

Referring to FIG. 8, the flow diagram summarises the above described methods of ingesting media content at a cache element in a P2P network. At step 801, the cache element commences the caching of blocks of data from the data stream into a file in its memory. As described above this may be in response to an instruction received from the ingestion element. At step 802 a missing data packet is identified from the data packet sequence identifier. At step 803, a determination is made of the size of the missed data packet, and at step 804 a portion of the file, with a size corresponding to the missed data packet is skipped. If, as shown at step 805, the caching of the block is not finished, then at step 806 the process of caching simply continues. When at step 805 the caching of a block is finished, at step 807 the cache element retrieves the metadata. If the block was not the first block in the content to be cached from the data stream, then at step 809 the cache element determines a location in the network where the missing data packets are stored, and at step 810 retrieves the missing packets. At step 811 the retrieved packets are inserted into the skipped portions in the file.

However, if at step 808 it was determined that the block is the first block of content to be cached, then at step 812 the size of the missed data packets from before the start of caching is determined. At step 813 a portion of the file with a size corresponding to that of the missing data packets is skipped. At step 814 the skipped portion is shifted back to the start of the file. The process then returns to steps 809-811 to retrieve the missing data packets and insert them into the skipped portion of the file.

Finally, at step 815, if all the blocks have been cached the process ends, otherwise it continues with the caching of more blocks (back to step 806).

It will be seen that the present invention provides an efficient method and system for ingesting media content from a RTP/multicast channel in a P2P network. The invention has particular benefits in the implementation of a timeshift TV system. The end-users are capable of downloading content after the content has started being aired. The process does not require changes to the data plane or to the RTP/multicast transmission. The caching, creation of metadata and synchronization happens in a way that is transparent to the multicast transmission.

The invention claimed is:

1. A method of ingesting media content in a peer-to-peer network from a data stream that comprises a sequence of packets of media data, wherein each packet is identified by a sequence identifier, the method comprising:
   commencing caching of the data packets from the data stream into a memory medium;
   identifying a missing data packet using the sequence identifiers of the packets and determining a size of the missing data packet;
   skipping a portion of the memory medium to provide a skipped portion of medium having no data cached therein, the skipped portion having a size corresponding to the determined size of the missing data packet;
   retrieving the missing data packet; and
   inserting the retrieved data packet into the skipped portion of the memory medium.

2. The method of claim 1 wherein the data stream is a multicast data stream.

3. The method of claim 2 wherein the multicast data stream comprises video data.

4. The method of claim 1, further comprising defining a block of media content to be ingested, and generating metadata associated with the block, the metadata identifying the media content of the block.

5. The method of claim 4 further comprising publishing the metadata so that it is accessible to users of the peer-to-peer network.

6. The method of claim 4 wherein the metadata includes at least the sequence identifier of the first data packet in the associated block.

7. The method of claim 6, wherein the sequence identifier is used by other peers of the peer-to-peer network to define a video block from the multicast data stream and to announce possession of the video block to the peer-to-peer network.

8. The method of claim 4 wherein the video block is comprised of segments and the metadata associated with the video block includes the hashes of the segments.

9. The method of claim 1 further comprising sending instructions to a network cache node, which include instructions to commence ingesting of data packets from the data stream into a file in the memory medium.

10. The method of claim 9, wherein the missing data packet is a data packet located before the first of the data packets ingested into the memory medium, and wherein the skipping of a portion of the memory medium occurs after the caching of the first data packet, the method further comprising shifting the skipped portion of the memory medium with no data cached therein to the beginning of the file before the missing data packet is retrieved and inserted.

11. A method of ingesting media content from a data stream that comprises a sequence of packets of media data, the method comprising:
    commencing caching of data packets from the data stream into a memory medium;
    determining a size of missing data packets before a first of the data packets cached into the memory medium;
    skipping a portion of the memory medium to provide a skipped, empty portion of medium having no data cached therein, the skipped portion having a size corresponding to the determined size of missing data packets; and
    shifting the skipped empty portion to before the first cached data packet.

12. The method of claim 11, wherein each of the data packets includes a sequence identifier, the size of the missing data packets being determined from the sequence identifier of the first of the data packets cached into the memory medium.

13. The method of claim 12, wherein the size of the missing data packets is determined based on the sequence identifier of an initial packet in the sequence of packets.

14. The method of claim 13 wherein the sequence identifier of the initial packet is included in the instructions sent to the cache node.

15. The method of claim 13 wherein the sequence identifier of the initial packet is obtained by the cache node from a metadata repository, storing metadata associated with the media data to be cached.

16. The method of claim 11 wherein the shifting comprises progressively rewriting cached data packets from before the skipped empty portion into the memory medium so that these occur after the skipped empty portion, thereby shifting the skipped empty portion to before the first cached data packet.

17. The method of claim 11 further comprising retrieving the missing data packets and inserting these into the skipped empty portion before the first cached data packet.

18. The method of claim 17 wherein the missing data packets are retrieved from one or more network nodes.

19. A network node in a peer-to-peer communications network, which network node is configured as a cache element for caching of media content from a data stream that comprises a sequence of packets of media data, the network node comprising:
    a memory medium for caching the content by sequentially copying of the data packets from the data stream;
    a processor configured to identify a missing data packet and determine a size of the missing data packet, skip a portion of the memory medium to provide a skipped portion of medium having no data cached therein, the skipped portion having a size corresponding to the determined size of the missing data packet, and insert a retrieved data packet into the skipped portion of the memory medium; and
    a communications interface for retrieving the missing data packet from another network node.

20. The network node of claim 19 wherein the missing data packet is a data packet from before a first of the data packets cached into the memory medium, and wherein the processor is configured to determine a size of missing data packets before a first of the data packets cached into the memory medium, to skip a portion of the memory medium so that the skipped portion is a skipped empty portion having a size corresponding to the determined size of missed data packets from before a first of the data packets cached into the memory medium; and to shift the skipped empty portion to before the first cached data packet prior to retrieving and inserting the missing data packet.

* * * * *